J. S. BROWN.
TOE CLIP.
APPLICATION FILED JULY 13, 1920.
1,417,447.
Patented May 23, 1922.
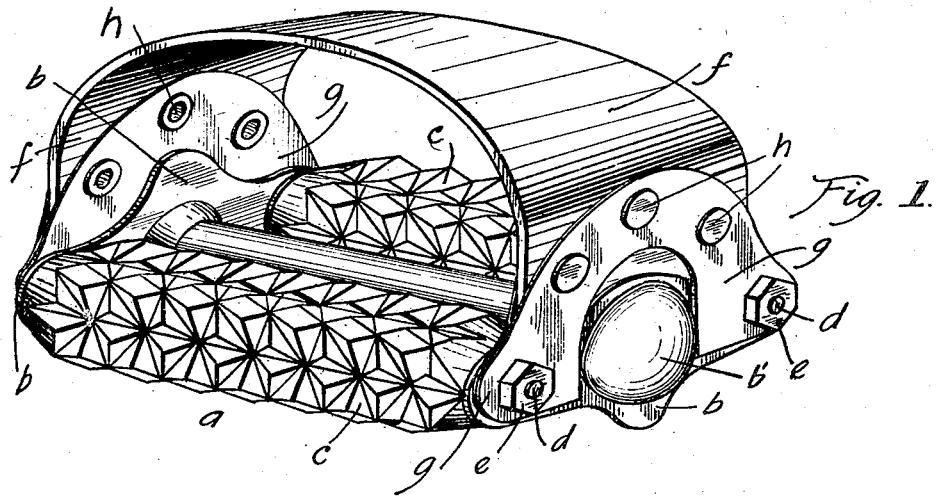
Fig. 1.
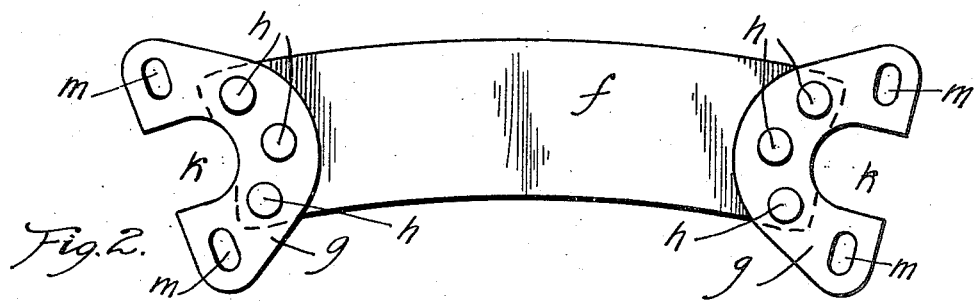
Fig. 2.
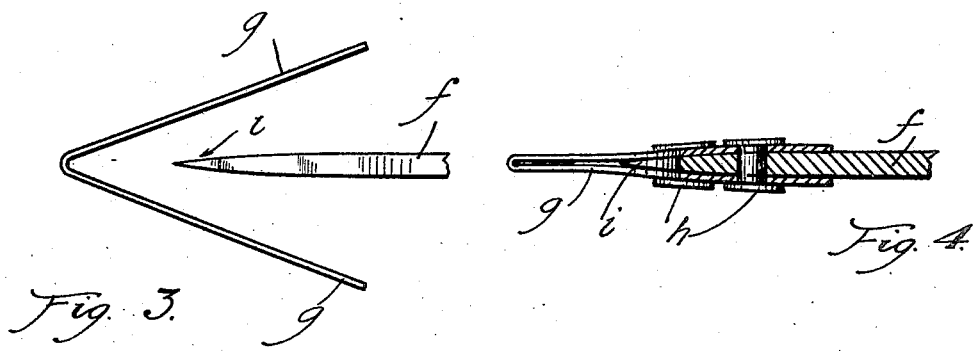
Fig. 3.
Fig. 4.
Inventor:
Joseph S Brown.
by
Atty.

UNITED STATES PATENT OFFICE.

JOSEPH S. BROWN, OF PORTLAND, OREGON.

TOE CLIP.

1,417,447.  Specification of Letters Patent.  Patented May 23, 1922.

Application filed July 13, 1920. Serial No. 395,889.

*To all whom it may concern:*

Be it known that I, JOSEPH S. BROWN, a citizen of the United States, and a resident of Portland, county of Multnomah, State of Oregon, have invented a new and useful Improvement in Toe Clips, of which the following is a specification.

This invention relates to bicycle accessories and consists particularly of an improved type of toe clips adapted for attachment to the pedals of a bicycle.

The main object of my invention is to provide a toe clip of an improved construction which will be far more satisfactory than other types previously used.

A further object of my invention is to provide a toe clip which can be readily secured to standard makes of bicycle pedals. Also to provide a toe clip inexpensive to manufacture, and of durable construction.

The above described, and incidental features I attain in the device illustrated in the accompanying drawings, in which, Fig. 1 is a perspective view of a bicycle pedal showing my improved type of toe clip attached thereto;

Fig. 2 is a developed view showing the general shape of my toe clip which is so essential to its great utility;

Fig. 3 is a view showing the relative position of inter-related parts of the toe clip before their attachment to each other; and Fig. 4 is a similar view showing these parts after attachment.

*a* represents a bicycle pedal of a standard construction consisting of a frame *b* rotatably mounted on a spindle *b'* and rubber treads *c* mounted on pins *d*. The latter are secured between the ends of the frame *b* and are held against displacement by the nuts *e*.

My toe clip, shown in its entirety in Fig. 2 comprises a leather band *f* and metallic clips *g* adapted to be secured to the ends of the band by rivets *h*.

The ends of the band are shaved down to a featheredge as shown at *i* in Fig. 3 and the clip is made of a single piece of metal adapted to be bent double and wholly encompass the ends of the band.

The clips *g* are made with a cut out portion *k* which provides proper clearance around the frame of the pedal.

The clips are further made with slots *m* adapted to engage the pins *d*. These slots permit the application of the clips to pedals of various makes. The peculiar construction of the clips *g* and their method of attachment to the band *f* provide a light good-looking well balanced device which is found in actual use to be a great improvement over other types of toe clips previously used.

The clips *g* form a support for holding the foot and preventing the same from forcing the leather *f* out of shape.

I claim:

1. A toe clip for bicycle pedals comprising a flexible band, a reinforcing plate on each end of the band, said plate being bent upon itself, straddling, and being secured to, the end of the band, the reinforcing plate having a portion cut away so as to be adapted to straddle the end of the pedal spindle, the extremities of the reinforcing plates being perforated for insertion therethrough of the rods supporting the treads of the pedal.

2. The combination set forth in claim 1 distinguished in that the ends of the band being feather edged so as to bring the two sides of the reinforcing plate close together.

3. The combination in a bicycle pedal of a frame mounted on a spindle, rods located one on each side of the spindle, a flexible band, a reinforcing plate on each end of the band, said reinforcing plate being U-shaped and stradding the end of the pedal spindle, the extremities of the reinforcing plate being perforated, the ends of said tread carrying rods extending through the latter perforations of the reinforcing plates and said rod ends being threaded and having nuts fitted thereon.

4. The combination in a bicycle pedal of a frame mounted on a spindle, rods located one on each side of the spindle, a flexible band, a reinforcing plate on each end of the band, the reinforcing plate being bent upon itself, straddling, and being secured to, the band end, and having a portion cut away so as to be adapted to straddle the end of the pedal spindle, the extremities of the reinforcing plate being perforated, the ends of said tread carrying rods extending through the latter perforations of the reinforcing plates and said rod ends being threaded and having nuts fitted thereon.

JOSEPH S. BROWN.